United States Patent [19]

Netzer

[11] 4,445,140
[45] Apr. 24, 1984

[54] ELECTRONIC IMAGE STABILIZATION SYSTEM

[75] Inventor: Yishay Netzer, Billerica, Mass.

[73] Assignee: Honeywell Inc., Minneapolis, Minn.

[21] Appl. No.: 335,414

[22] Filed: Dec. 29, 1981

[51] Int. Cl.³ .............................................. H04N 5/00
[52] U.S. Cl. .................................................. 358/222
[58] Field of Search .............. 358/222, 211, 225, 125, 358/126

[56] References Cited

U.S. PATENT DOCUMENTS 3,594,556  7/1971  Edwards ............................. 358/222
4,021,847  5/1977  Van Atta ............................. 358/222
4,245,254  1/1981  Svensson ............................. 358/222

OTHER PUBLICATIONS

Improvement of an Anti-vibration Mount for NHK's Helicopter Color Camera System, Kasama et al., NHK Tech Journal vol. 23, #2, (1971). pp. 66–82.

*Primary Examiner*—Michael A. Masinick
*Attorney, Agent, or Firm*—John S. Solakian; Laurence J. Marhoefer

[57] ABSTRACT

An imaging system in which the line of sight defined by the spatial position of optical and detector elements in such system is movable in a first axis by a signal which is used to modulate a bias or mid position of a scanning mirror included in such optical elements and in a second axis by modulating the time delay between video information of the scene imaged and the synchronization pulses used for display in the direction of such second axis.

10 Claims, 3 Drawing Figures

ELECTRONIC IMAGE STABILIZATION SYSTEM

BACKGROUND OF THE INVENTION

The present invention relates generally to optical systems and more particularly to image stabilization systems usable with such optical systems.

Stabilization of an imaging device such as used in infrared detection systems is required in order to accurately detect the scene of interest. Such stabilization has in the past been implemented in several ways. One such method is to gimbal the entire imaging device. In doing so, the gimbal system is used for steering while stabilization of the line of sight is achieved through the augmented inertia of the imaging system. A second method is implemented by keeping the imaging device hard mounted, i.e., secured in a predetermined position with respect to the vehicle in which it resides, and stabilizing the line of sight by means of one or two mirrors. In this method, stabilization is achieved by a compensatory motion of the mirror and is opposed, rather than aided, by inertial forces.

In the particular case of a stabilization system mounted in a vehicle such as, for example, a tank, steering of the line of sight is unnecessary because the sight is fixed to the turret, and the head mirror is slaved to the gun which is coarsely, but not optically, stabilized. As a result, the residual jitter in the line of sight is relatively small, though sufficient to render the image almost useless when the tank is moving. The controlling of the head mirror in this manner requires an expensive servo system having complex mechanical components.

It is accordingly a primary object of the present invention to provide an improved image stabilization system.

SUMMARY OF THE INVENTION

The purposes and objects of the present invention are achieved by providing optical and detector elements, including imaging optics, a first axis scanning mirror, an image plane, detector apparatus disposed in the image plane along a second axis, and wherein a line of sight is defined by the spatial relationship among the optical and detector elements. Further, apparatus is coupled with the detector apparatus for providing a composite video signal which includes video information which is representative of the scene of interest, line synchronization pulses and field synchronization pulses. Yet further apparatus is provided to enable movement of the line of sight along the first axis by means of signal modulation of the bias, or mid, position of the scanning mirror, and in the second axis by modulating the time delay between the video information and the line synchronization pulses.

BRIEF DESCRIPTION OF THE DRAWINGS

The above and other objects of the present invention are achieved in an illustrative embodiment as described with respect to the Figures in which.

DETAILED DESCRIPTION OF THE PREFERRED EMBODIMENT(S)

Figure 1:
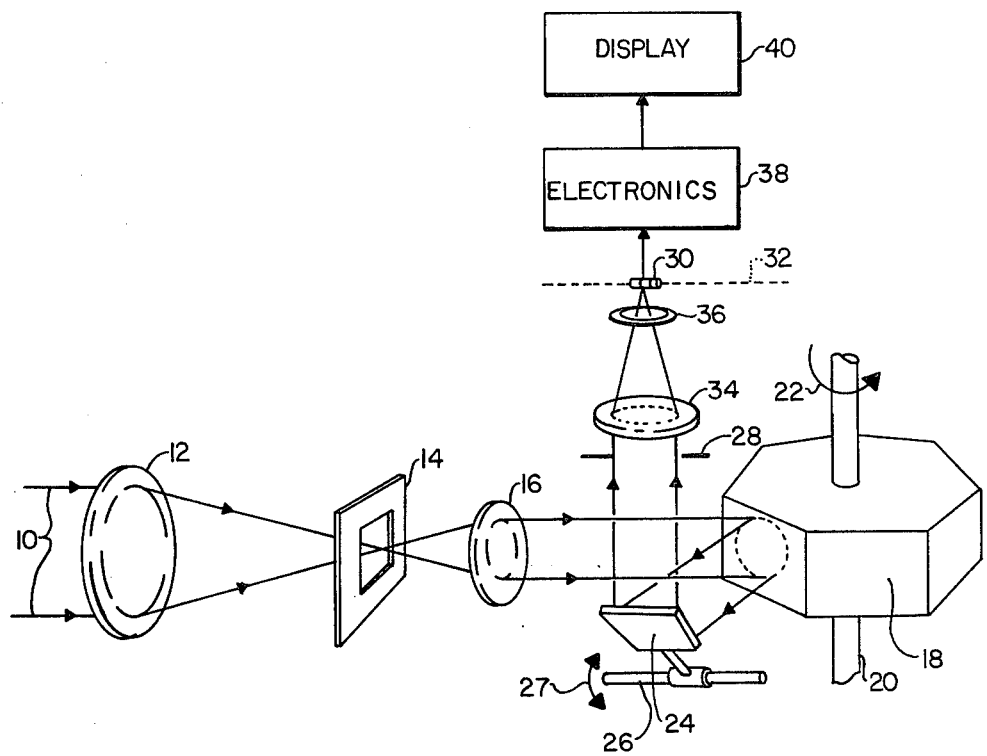
FIG. 1 illustrates the system in which the apparatus of the present invention is used.

Referring to FIG. 1, an optical system and associated components with which the apparatus of the present invention may be used, is shown. Radiation from the scene of interest is represented by lines 10. Such radiation is received by objective lens 12, and in turn passes through collimator lens 16 via field stop 14. The optical path continues on a line of sight and reflects on a high speed spin mirror 18 which rotates about shaft 20 (representative of a second axis) in the direction shown by arrow 22. The path then continues by reflecting off of field scanning mirror 24 which oscillates about shaft 26 (representative of a first axis) by a small angle as represented by double arrow 27. After passing through aperture stop 28, the radiation is received by detector(s) 30 which lies on an image plane 32 as shown by the dotted lines. Detector lens 34 and cold shield 36 are also in the path between mirror 24 and detector(s) 30. The detector(s) 30 are coupled to display information on display device 40 via electronics 38. The optical system operates in a manner well-known in the prior art. For example, refer to "THERMAL IMAGING SYSTEM" by J. M. Lloyd, published by Plenum Press, New York (1975), for a further description thereof.

The present invention accomplishes the desired image stabilization without the need for complex mechanical components used in a servo system. Rather, the present invention utilizes a fixed head mirror and achieves image stabilization by feeding inertially measured correction signals to the line, or, for example, horizontal, sync generator to effect horizontal image compensation. Compensation of the scanning mirror in the first axis, or, for example, vertical axis, is also provided in response to such correction signals. The use of electronics to achieve such line image stabilization has heretofore been accomplished by mechanical servo apparatus.

Figure 2:
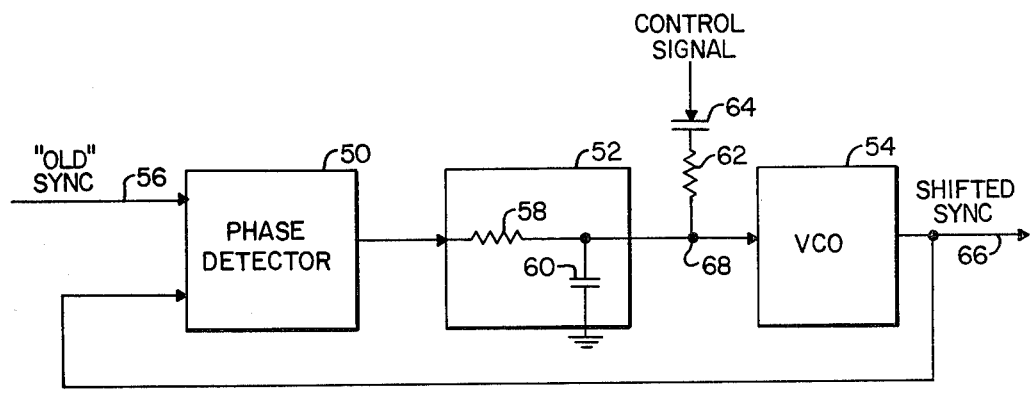
FIG. 2 is a general block diagram illustrating a portion of one embodiment of the stabilization system of the present invention.

Prior to discussing the line, or horizontal, image compensation technique as shown in the block diagram of FIG. 2, the field, or vertical, compensation shall be briefly discussed. For the vertical axis, the correction command is superimposed on a sawtooth input waveform which is applied to the scanning mirror 24 and is representative of the oscillating motion thereof. Without this correction, the scanning lines would not be evenly spaced relative to the image, i.e., target, plane unless the vehicle were stationary. Under angular vibrations, the scan speed would no longer be constant with respect to inertial space. Accordingly, the scan lines may overlay or even intermingle, thereby disrupting the linear time-to-position relationship. This is particularly sensitive in a high interlace ratio system such as a forward looking infrared system (FLIR). With the correction signal applied, these vertical scan lines are evenly spaced in the image plane regardless of the vibrations encounterd.

In the line or horzontal axis, the stabilization is effected differently. The present invention relies on the offsetting of the image plane relative to the permitted field-of-view, i.e., the field stop. To appreciate how this is done, it is noted that it is possible to change the horizontal image position on a video display relative to the display raster scan by modifying the delay time between the display's horizontal synchronization ("sync") pulses and the reference pulses of, or similar to, those provided from the mirror 18 when spinning. This modification does not interfere with the scanner or sync generation circuits of the display. This modification is equivalent to panning a camera because the position of each pixel (i.e., picture element) is shifted relative to the sync pulse which starts the corresponding line. By dynamically modulating such delay, horizontal correction can be achieved much above the expected jitter bandwidth.

Now referring to FIG. 2, the horizontal image compensation apparatus shall now be described. The horizontal channel of image position control is based on modifying the time position or phase of the horizontal sync pulses relative to the video information and the horizontal sync pulse (i.e., the "old" horizontal sync pulse) provided therewith. To enable image motion in both directions, left or right, the delay may be either negative or positive. A variable delay for this purpose is implemented by means of a phase-locked-loop a shown in FIG. 2.

The phase-locked-loop includes a voltage controlled oscillator (VCO) 54, a phase detector 50, and a loop filter 52. The input to the phase-locked-loop is the "old" horizontal sync signal received on line 56 at one input of phase detector 50. The VCO 54 locks on the "old" sync signal in both frequency and phase. The phase lock is achieved by virtue of an edge-triggered phase detector as may be provided, for example, by use of a type CD4046 circuit manufactured by, for example, Radio Corporation of America (RCA). The VCO 54 and the phase detector 50 may be implemented in the same model CD4046 circuit as shown in FIG. 3.

In the absence of a control signal received via coupling capacitor 64 and resistor 62, the leading edge of the output signal of VCO 54 on line 66, which is fed back to the other input of detector 50, coincides with the leading edge of the "old" sync pulses on line 56. Applying a control signal which is additive to the output of phase detector 50, generates a phase shift at point 66. Such control signal is applied via the loop filter 52 which includes resistor 58 and capacitor 60. This occurs in order for the loop to remain frequency locked. That is, the VCO 54 input voltage at point 66 must remain the same. This is done by an equal and negative voltage change at the output of detector 50 as represented at point 66. Such voltage change signifies a change in the VCO output phase relative to the input of the phase-locked-loop as desired.

Figure 3:
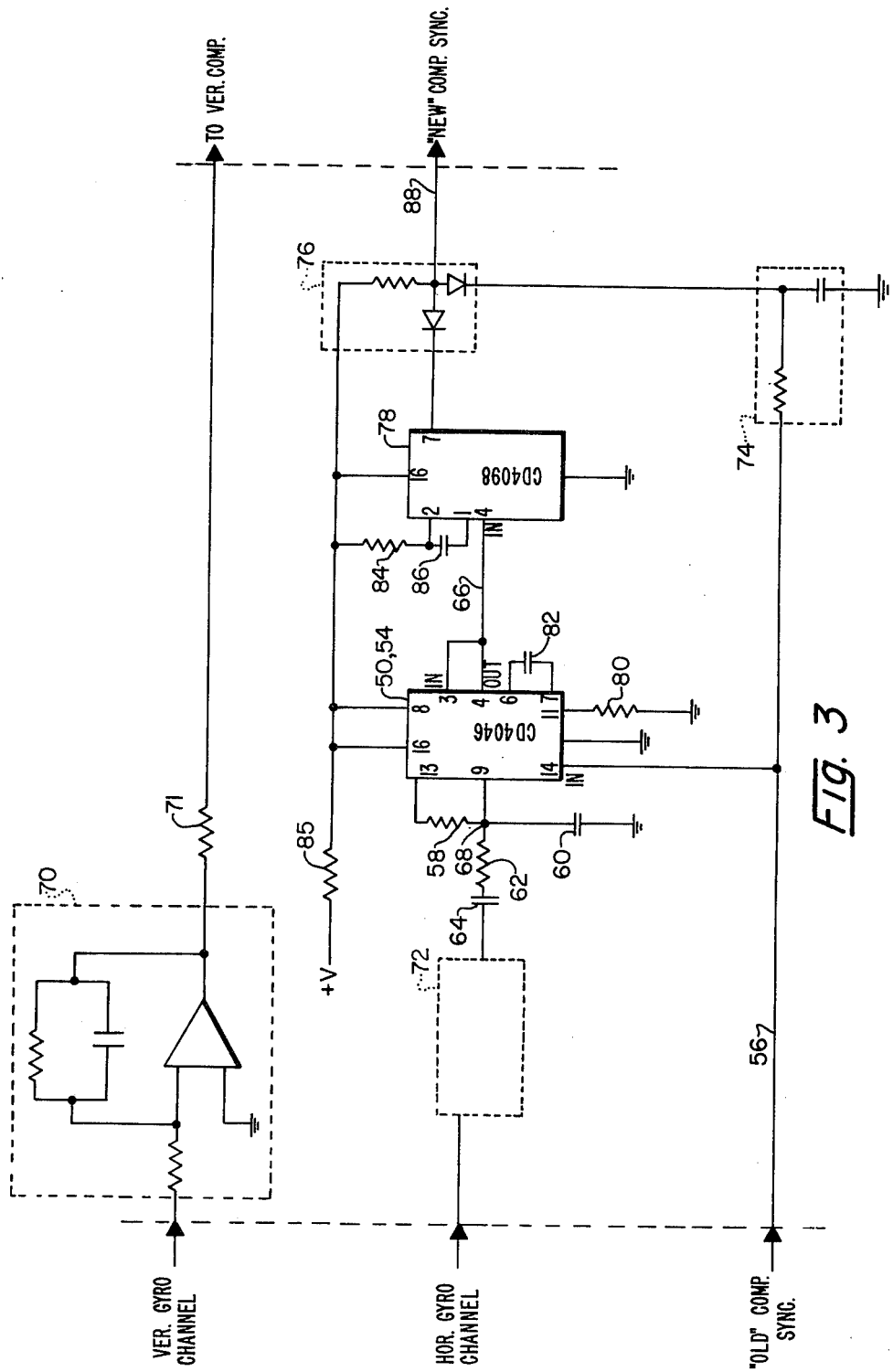
FIG. 3 is a more detailed diagram of one embodiment of the stabilization system of the present invention.

Now referring to FIG. 3, a more detailed description of the stabilization system of the present invention will be provided. In the vertical channel, the output of the corresponding rate gyro is integrated to obtain the vertical angular position. This is done by means of integrator 70 which may include the amplifier and other components shown, including a summing resistor at the output of such amplifier. The output of the integrator is coupled to a vertical compensation system via summing resistor 71 to achieve the desired results. It should be noted that the integrator 70 (as well as integrator 72 on the horizontal axis) is not needed if the gyro used is a rate integrating, i.e., position, gyro.

In the horizontal channel, following the integration by, for example, integrator 72 which may be similar to integrator 70, the integrated signal is coupled for receipt by VCO 54 via coupling capacitor 64 and coupling resistor 62 at pin 9 of the CD4046. Components 58 and 60 of loop filter 52 are shown coupled to the other end of resistor 62. Resistor 80 coupled with the CD4046 at pin 11 is used to set the voltage control time delay, whereas capacitor 82 coupled between pins 6 and 7 is set so that the frequency of VCO 54 generated pulses is as close as possible to the horizontal sync pulse frequency. Power is supplied to VCO 54, as well as one-shot circuit 78, via bias resistor 85.

The output of VCO 54 at pin 4 of the CD4046 is coupled via line 66 to the input of a one-shot multivibrator 78 which may be a model CD4098 and which may also be manufactured by the above-noted manufacturer of the CD4046. Such VCO output is also coupled to pin 3 which is one input of phase detector 50. The timing of the one-shot 78 is provided by resistor 84 and capacitor 86. The output of one-shot 78 provides a properly timed and formed new sync pulse which is coupled to one input of OR gate 76, which may include two diodes and a resistor as shown. The output of gate 76 is the new composite sync signal. The composite sync signal includes the video information as well as the horizontal sync pulses. Thus, the new composite sync signal on line 88 includes the video information as received on line 56, as well as the new horizontal sync pulse as received from one-shot 78.

The video information is removed from the old composite sync signal on line 56 via low pass filter 74 which may simply include a resistor and a capacitor as shown. The output of filter 74 is coupled to the other input of gate 76 such that the original video information and the new sync pulse combine to provide the new composite sync signal.

The old composite sync signal is also effectively coupled for receipt by the other input (pin 14 of the CD4046) of the phase detector 50. As indicated hereinbefore, the other input to phase detector 50 is received on pin 3 from the output of the VCO 54 on pin 4 of the CD4046.

It can be seen that other techniques may be used to implement the teachings of the present invention. For example, the phase shifting of the "old" sync pulses may be implemented in a purely digital manner by counting high frequency clock pulses from a master clock in accordance with the desired phase shaft. Although negative delays cannot be obtained from such a digital technique, this would pose no problem since normally, with no correction, a number of master clock pulses can be counted to give a delay of exactily one horizontal line which is indistinguishable on the display, as far as an operator is concerned. This one line delay is similar to the natural delay of the phase-locked-loop. By changing the duration of this delay image, motion in the horizontal axis can be effected.

Having described the invention, what is claimed as new and novel and for which it is desired to secure Letters Patent is:

1. Image stabilization apparatus comprising:
   A. imaging optics for receiving information;
   B. a scanning mirror coupled to receive said information along a first viewing axis;
   C. an image plane;
   D. detector means disposed on said image plane, said detector means coupled to receive said information;
   E. wherein the respective spatial positions of said optics, mirror, plane and detector means define a line of sight;
   F. means for generating an output composite video signal including video information derived from said information seen by said optics, and including line synchronization pulses and field synchronization pulses;

G. first means for moving said line of sight along said first viewing axis, said first means for moving including first means for modulating the position of said scanning mirror; and H. second means for moving said line of sight along a second viewing axis, said second means for moving including second means for modulating the time delay between said video information and said line synchronization pulses.

2. Apparatus as in claim 1 further comprising:

A. a rotating, multi-faceted scanning mirror coupled to receive said information;

B. wherein the spatial position of said rotating scanning mirror also defines said line of sight; and wherein C. said second means for modulating changes the time delay between pulses representative of the position of said rotating scanning mirror and said line synchronization pulses.

3. Apparatus as in either claim 1 or claim 2 wherein said apparatus is mounted on a vehicle wherein angular vibrations of said vehicle induce jitter, or vibrations, in said line of sight and further comprising means for sensing said jitter, or vibrations, and applying a signal generated by said means for sensing to said first and second means for moving so as to stabilize said line of sight.

4. Apparatus as in claim 3 wherein said means for sensing are gyroscopes.

5. Apparatus as in claim 4 wherein said vehicle is a tank having a gun and wherein said gyroscopes are mounted to sense the vibration of said gun.

6. Apparatus as in claim 4 wherein said vibrations are sensed by inertial sensors which are used solely by said image stabilization apparatus.

7. Apparatus as in claim 3 wherein said vibrations are sensed by the processing of said video signal.

8. Apparatus as in claim 3 wherein said line synchronization pulses are horizontal synchronization pulses for said video signal and wherein said field synchronization pulses are vertical synchronization pulses for said video signal.

9. Apparatus as in claim 3 wherein said means for sensing and applying said signal include:

A. a phase detector, having two inputs and an output, which produces a voltage change at said output if there is a change in phase between signals received at said two inputs;

B. a voltage controlled oscillator having an input and an output, said output coupled as one of said inputs to said phase detector, said oscillator coupled to provide a signal at its output if there is a change in the frequency of a signal at its input; and C. means for coupling said signal which is indicative of said vibrations and for coupling the output of said phase detector to said input of said oscillator whereby a new line synchronization signal indicative of said vibrations is shifted from the position of said line synchronization signal which existed before said vibrations so as to stabilize said image as seen on a display thereof.

10. Apparatus as in claim 9 further comprising a filter and a coupling network and wherein said filter is coupled between said output of said phase detector and said input of said oscillator and wherein said coupling network is coupled between said signal which is indicative of said vibrations and said input of said oscillator.

* * * * *